(12) United States Patent
Heo et al.

(10) Patent No.: US 11,128,193 B2
(45) Date of Patent: Sep. 21, 2021

(54) COMPRESSOR

(71) Applicant: Hanon Systems, Daejeon (KR)

(72) Inventors: Jeong Gil Heo, Daejeon (KR); Shinji Tagami, Daejeon (KR); Bong Kyun Seo, Daejeon (KR); Kyung Jae Lee, Daejeon (KR)

(73) Assignee: Hanon Systems, Daejeon (KR)

( * ) Notice: Subject to any disclaimer, the term of this patent is extended or adjusted under 35 U.S.C. 154(b) by 355 days.

(21) Appl. No.: 16/068,860

(22) PCT Filed: Jul. 14, 2017

(86) PCT No.: PCT/KR2017/007611
§ 371 (c)(1),
(2) Date: Jul. 9, 2018

(87) PCT Pub. No.: WO2018/048086
PCT Pub. Date: Mar. 15, 2018

(65) Prior Publication Data
US 2020/0395807 A1 Dec. 17, 2020

(30) Foreign Application Priority Data
Sep. 8, 2016 (KR) .................. 10-2016-0115825

(51) Int. Cl.
*H02K 5/10* (2006.01)
*H02K 3/50* (2006.01)
(Continued)

(52) U.S. Cl.
CPC .......... *H02K 3/50* (2013.01); *F04D 25/0693* (2013.01); *F04D 29/08* (2013.01); *F04D 29/403* (2013.01);
(Continued)

(58) Field of Classification Search
CPC ............. H02K 5/225; H02K 5/10; H02K 3/50
See application file for complete search history.

(56) References Cited

U.S. PATENT DOCUMENTS 8,840,381 B2 * 9/2014 Fukasaku .............. F04C 23/008
417/423.7
9,574,560 B2 * 2/2017 Adaniya ............... F04C 11/008
(Continued)

FOREIGN PATENT DOCUMENTS

JP        H109137 A    1/1998
JP     2007128756 A    5/2007
(Continued)

*Primary Examiner* — Dang D Le
(74) *Attorney, Agent, or Firm* — Norton Rose Fulbright US LLP; James R. Crawford

(57) ABSTRACT

The present disclosure relates to a compressor including: a motor configured to generate a driving force; a compression mechanism configured to be driven by the motor to compress a refrigerant; an inverter configured to control the motor; a connector configured to electrically connect the motor and the inverter to each other; and a sealing member configured to seal a connection portion between a terminal of the motor electrically connected to the connector and the connector. Therefore, the refrigerant may be prevented from being introduced into the motor terminal and a short circuit may be prevented from occurring in the motor terminal.

19 Claims, 6 Drawing Sheets

(51) Int. Cl.

| | | |
|---|---|---|
| *H02K 11/33* | (2016.01) | |
| *F04D 25/06* | (2006.01) | |
| *F04D 29/08* | (2006.01) | |
| *F04D 29/40* | (2006.01) | |
| *F25B 1/00* | (2006.01) | |
| *F25B 31/02* | (2006.01) | |
| *H01R 9/24* | (2006.01) | |
| *H01R 13/52* | (2006.01) | |
| *H02K 5/22* | (2006.01) | |

(52) U.S. Cl.
CPC ................ *F25B 1/00* (2013.01); *F25B 31/02* (2013.01); *H01R 9/24* (2013.01); *H01R 13/5205* (2013.01); *H02K 5/10* (2013.01); *H02K 5/22* (2013.01); *H02K 5/225* (2013.01); *H02K 11/33* (2016.01); *H01R 2201/10* (2013.01)

(56) References Cited

U.S. PATENT DOCUMENTS

| | | |
|---|---|---|
| 2008/0138226 A1 | 6/2008 | Koitabashi et al. |
| 2012/0228023 A1 | 9/2012 | Fukasaku et al. |
| 2014/0375157 A1 | 12/2014 | Taguchi et al. |

FOREIGN PATENT DOCUMENTS

| | | |
|---|---|---|
| JP | 2011514135 A | 4/2011 |
| JP | 2012184752 A | 9/2012 |
| JP | 2014114795 A | 6/2014 |
| JP | 2015183668 A | 10/2015 |
| KR | 20150109156 A | 10/2015 |

\* cited by examiner

COMPRESSOR

This application is a § 371 of international Application No. PCT/KR2017/007611 filed Jul. 14, 2017, and claims priority from Korean Patent Application No. 10-2016-0115825 filed Sep. 8, 2016. The entire contents of these applications are incorporated herein by reference in their entirety.

TECHNICAL FIELD

Exemplary embodiments of the present disclosure relate to a compressor, and more particularly, to a compressor capable of compressing a refrigerant by a driving force of a motor controlled by an inverter.

BACKGROUND ART

Generally, a compressor used in an HVAC system in automobiles is configured to suck a refrigerant evaporated from an evaporator, compress the sucked refrigerant so that the refrigerant is in a high-temperature and high-pressure state, and supply the compressed refrigerant to a condenser.

The compressor is classified into a type of compressor that performs compression operation by a driving force received from an automobile engine and a type of compressor that performs compression operation by driving an electric motor (hereinafter, a motor) to which power is supplied separately.

FIG. 1 is a cross-sectional view showing a conventional compressor that performs a compressing operation by driving a motor and FIG. 2 is an exploded perspective view showing a connector and a terminal in FIG. 1.

Referring to FIGS. 1 and 2, the conventional compressor includes, in a casing 1, a motor 2 that generates a driving force, a compression mechanism 3 that is driven by the motor 2 to compress a refrigerant, an inverter 4 that controls the motor 2, and a connector 5 that electrically connects the motor 2 and the inverter 4 to each other, and the conventional compressor is configured so that a cooling efficiency is variably adjusted while adjusting a rotation speed of the motor 2 by the control of the inverter 4.

In this case, the motor 2 is usually provided in a motor accommodation space S1 formed in a side of the casing 1, the inverter 4 is usually provided in an inverter accommodation space S2 formed in the side of the casing 1, and the connector 5 electrically connects the motor 2 and the inverter 4 to each other while sealing the motor accommodation space S1 and the inverter accommodation space S2 with each other and being connected to a terminal 24 of the motor 2 (hereinafter, a motor terminal) and a terminal 43 of the inverter 4 (hereinafter, an inverter terminal).

The connector 5 includes a terminal pin 52 that penetrates a terminal holder 51 to be described below to electrically connect the motor 2 and the inverter 4 to each other, the terminal holder 51 that seals the motor accommodation space S1 and the inverter accommodation space S2 while supporting the terminal pin 52, and an insulator 53 that insulates the terminal pin 52 from the terminal holder 51.

The motor terminal 24 is formed to electrically connect a coil 212 extended from the motor 2 and the connector 5 to each other.

Specifically, the motor terminal 24 is formed of a terminal block 241 having an internal space and a conductive material and includes a connection terminal 242 provided in the internal space of the terminal block 241.

The connection terminal 242 is connected to the coil 212 that penetrates the terminal block 241 to be inserted into the internal space of the terminal block 241, and is connected to the terminal pin 52 that penetrates the terminal block 241 to be inserted into the internal space of the terminal block 241, so as to electrically connect the coil 212 and the terminal pin 52 to each other.

However, in such a conventional compressor, a short circuit occurs in an electrical circuit between the inverter 4 and the motor 2 due to a refrigerant. In more detail, the refrigerant is introduced into the terminal block 241, a short circuit thus occurs in the motor terminal 24. That is, a current flowing in the coil 212, the connection terminal 242, and the connector 5 is short-circuited in the terminal block 241 through the refrigerant. Therefore, malfunction and breakage of the compressor occur. Meanwhile, the refrigerant of the motor accommodation space S1 is introduced into the inverter accommodation space S2 through a connection portion between the connector 5 and the casing 1, a short circuit thus occurs in the inverter 4.

DISCLOSURE

Technical Problem

An object of the present disclosure is to provide a compressor capable of preventing a short circuit from occurring in an electrical circuit between an inverter and a motor due to a refrigerant.

Technical Solution

In accordance with one aspect of the present disclosure, a compressor includes: a motor configured to generate a driving force; a compression mechanism configured to be driven by the motor to compress a refrigerant; an inverter configured to control the motor; a connector configured to electrically connect the motor and the inverter to each other; and a sealing member configured to seal a connection portion between a terminal of the motor electrically connected to the connector and the connector.

The connector may include a terminal pin configured to electrically connect the motor and the inverter to each other, a terminal holder configured to support the terminal pin, and an insulator configured to insulate the terminal pin from the terminal holder, and at least a portion of the sealing member may be in contact with the insulator is formed of a material having insulation and elasticity.

The terminal may include a terminal block configured to have an internal space, a first opening for communicating the internal space with an external space and a second opening for communicating the internal space with the external space, and a connection terminal configured to be provided in the internal space of the terminal block and to connect the terminal pin of the connector being inserted into the first opening and a coil of the motor being inserted into the second opening to each other, and the sealing member may include a first annular portion configured to be inserted into the first opening, to have an outer circumferential surface thereof tightly fitted into an inner circumferential surface of the first opening, and to have an inner circumferential surface thereof tightly fitted into an outer circumferential surface of the terminal pin, and a second annular portion configured to be extended from the first annular portion, to have an outer diameter thereof larger than that of the first annular portion, and to be disposed in the external space of the terminal block.

In the sealing member, the second annular portion may be tightly fitted into the insulator, and at least the second annular portion may be formed of a material having insulation and elasticity.

In the sealing member, the first annular portion and the second annular portion may be formed of a material having insulation and elasticity.

The first annular portion may be formed to be compressed between the first opening and the terminal pin.

A first protrusion may be formed on the outer circumferential surface of the first annular portion, the first protrusion protruding from the outer circumferential surface of the first annular portion and extending in a circumferential direction of the first annular portion, an outer diameter of the first protrusion may be formed to be equal to or larger than an inner diameter of the first opening, an inner diameter of the first annular portion may be formed to be equal to or smaller than an outer diameter of the terminal pin, a thickness between an outer circumferential surface of the first protrusion and the inner diameter of the first annular portion may be formed to be larger than a gap between the inner circumferential surface of the first opening and the outer circumferential surface of the terminal pin, and in a case where the terminal, the connector, and the sealing member are assembled, the first protrusion may be pressed to the first opening, the inner circumferential surface of the first annular portion may be pressed to the terminal pin, and the first annular portion may be compressed between the first opening and the terminal pin.

A casing configured to accommodate the motor, the compression mechanism, the inverter, the connector, and the sealing member may be further included, the casing may include a motor accommodation space in which the motor is accommodated and a partition wall partitioning an inverter accommodation space in which the inverter is accommodated, the partition wall may include a connector mounting hole on which the connector is mounted such that the connector penetrates the partition wall to connect the motor and the inverter to each other, the connector mounting hole may include a first recess which is formed in the partition wall to be recessed from the inverter accommodation space and has a first seating surface on which the terminal holder is seated, a second recess which is formed to be recessed from the first seating surface, has an inner diameter thereof smaller than that of the first recess, and has a second seating surface on which the second annular portion of the sealing member is seated, and a third recess which is formed to be recessed from the second seating surface, has an inner diameter thereof smaller than that of the second recess, and communicates with the motor accommodation space, and the second annular portion of the sealing member may be formed to be compressed between the terminal holder and the second seating surface or between the insulator and the second seating surface.

The second annular portion may have a bottom surface which faces the second seating surface and an upper surface which is a rear surface of the bottom surface and faces the terminal holder and the insulator, a second protrusion may be formed on the upper surface of the second annular portion, the second protrusion protruding from the upper surface of the second annular portion, extending in a circumferential direction of the second annular portion, and being in contact with the insulator, a third protrusion may be formed on the bottom surface of the second annular portion, the third protrusion protruding from the bottom surface of the second annular portion, extending in the circumferential direction of the second annular portion, and being in contact with the second seating surface, a thickness between a tip surface of the second protrusion and a tip surface of the third protrusion may be formed to be larger than a gap between the second seating surface and the insulator, and in a case where the connector, the partition wall, and the sealing member are assembled, the second protrusion may be pressed to the insulator, the third protrusion may be pressed to the second seating surface, and the second annular portion may be compressed between the insulator and the second seating surface.

The insulator may be formed so that one end of the insulator protrudes from the terminal holder toward the terminal, the one end of the insulator may be formed so that an outer diameter thereof gradually decreases from the terminal holder toward the terminal and a decrease rate of the outer diameter is gradually reduced, and the second protrusion may be formed to be in contact with a portion having the largest decrease rate of the outer diameter in the one end of the insulator.

In the second annular portion, a portion other than the second protrusion may be formed to be spaced from the insulator.

The sealing member may further include an annular member interposed between the second annular portion and the insulator, and the annular member may be formed of a material having insulation and elasticity.

The annular member may be formed to be compressed between the second annular portion and the insulator.

The insulator may be formed so that one end of the insulator protrudes from the terminal holder toward the terminal, the one end of the insulator may be formed so that an outer diameter thereof gradually decreases from the terminal holder toward the terminal and a decrease rate of the outer diameter is gradually reduced, and the annular member may be formed to be in contact with a portion having the largest decrease rate of the outer diameter in the one end of the insulator.

The insulator may be formed of a glass material.

A casing configured to accommodate the motor, the compression mechanism, the inverter, the connector, and the sealing member may be further included, the casing may include a motor accommodation space in which the motor is accommodated and a partition wall partitioning an inverter accommodation space in which the inverter is accommodated, the connector may penetrate the partition wall to electrically connect the motor and the inverter to each other, and the sealing member may be formed to further tightly seal a portion between the connector and the partition wall.

Advantageous Effects

The compressor according to the present invention includes a sealing member sealing a portion between the connector and the motor terminal, the refrigerant may be prevented from being introduced into the motor terminal to prevent a short circuit from occurring in the motor terminal. In addition, since the sealing member is formed so as to sea between the connector and the casing, the refrigerant is prevented from being introduced into the inverter accommodation space, thus the short circuit may be prevented in the inverter.

BEST MODE FOR INVENTION

Hereinafter, a compressor according to the present disclosure will be described in detail with reference to the drawings.

Figure 1:
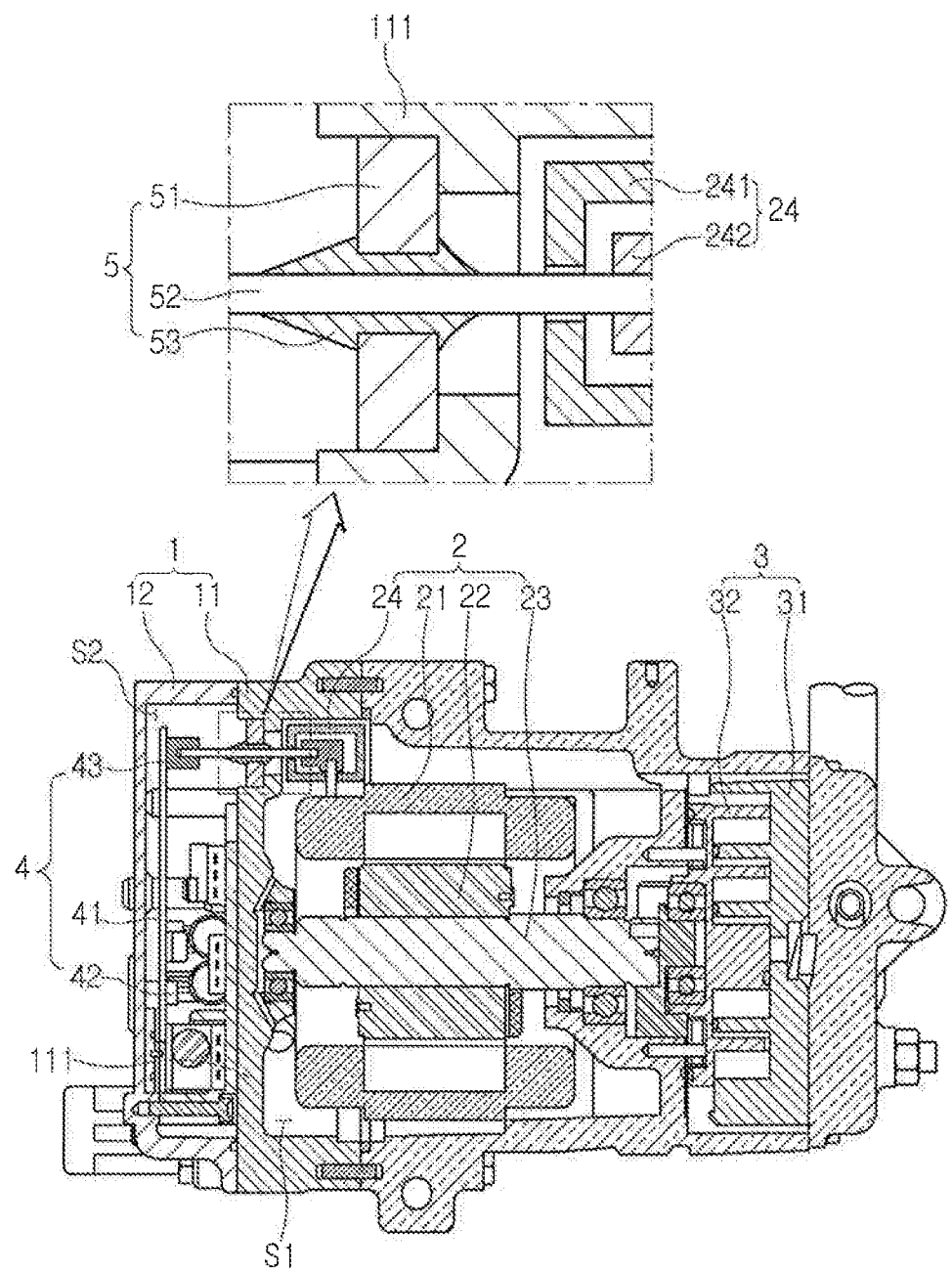
FIG. 1 is a cross-sectional view showing a conventional compressor.
Figure 2:
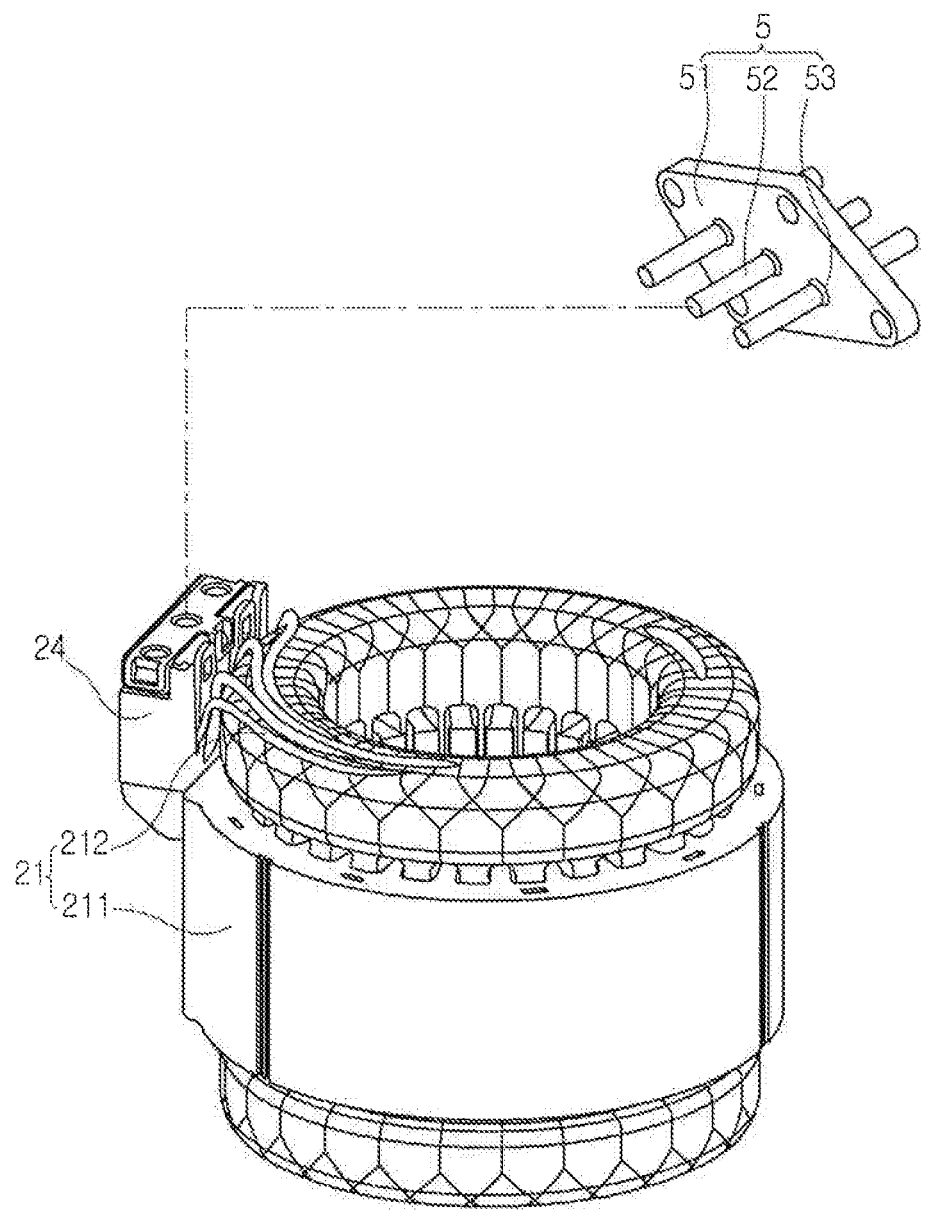
FIG. 2 is an exploded perspective view showing a connector and a terminal in FIG. 1.
Figure 3:
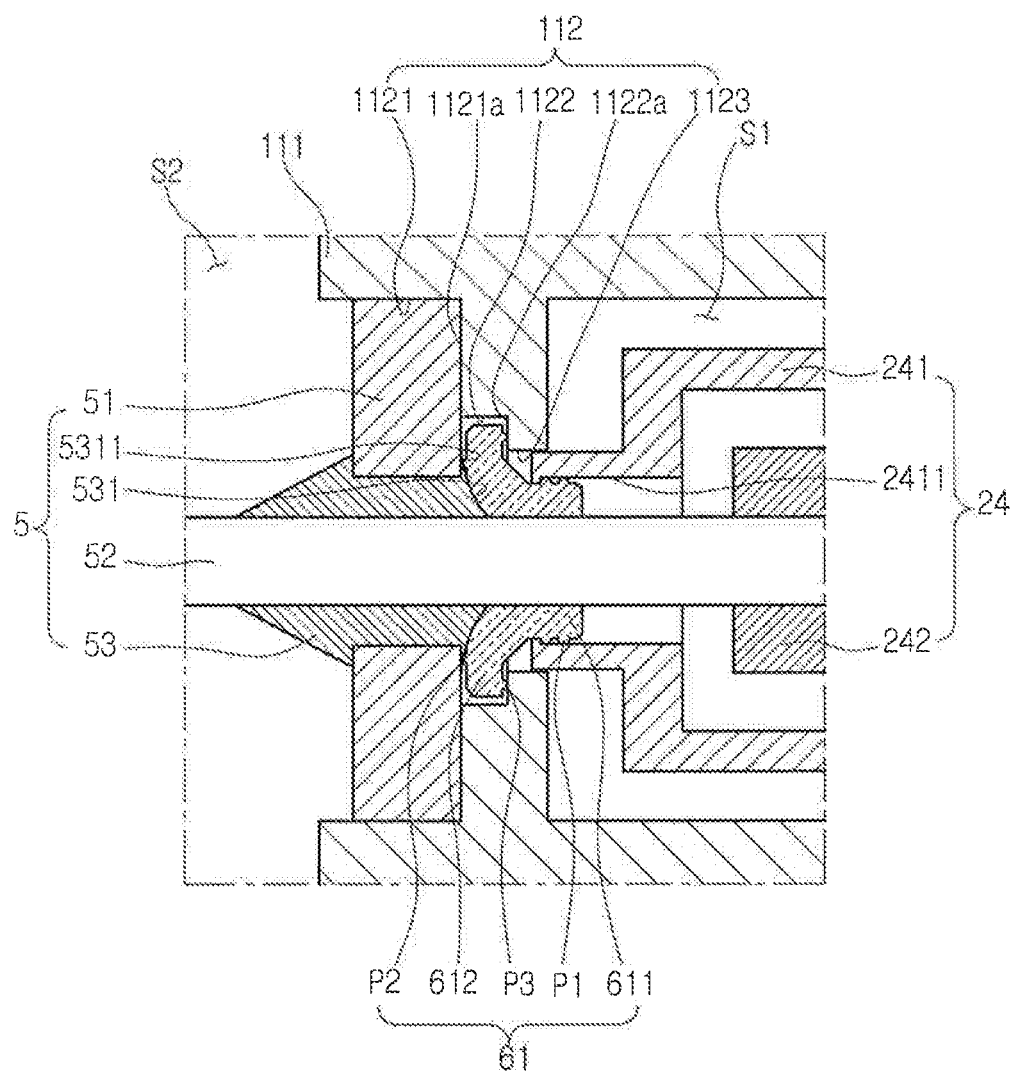
FIG. 3 is a cross-sectional view showing a connection portion between a connector and a terminal in a compressor according to an exemplary embodiment of the present disclosure.
Figure 4:
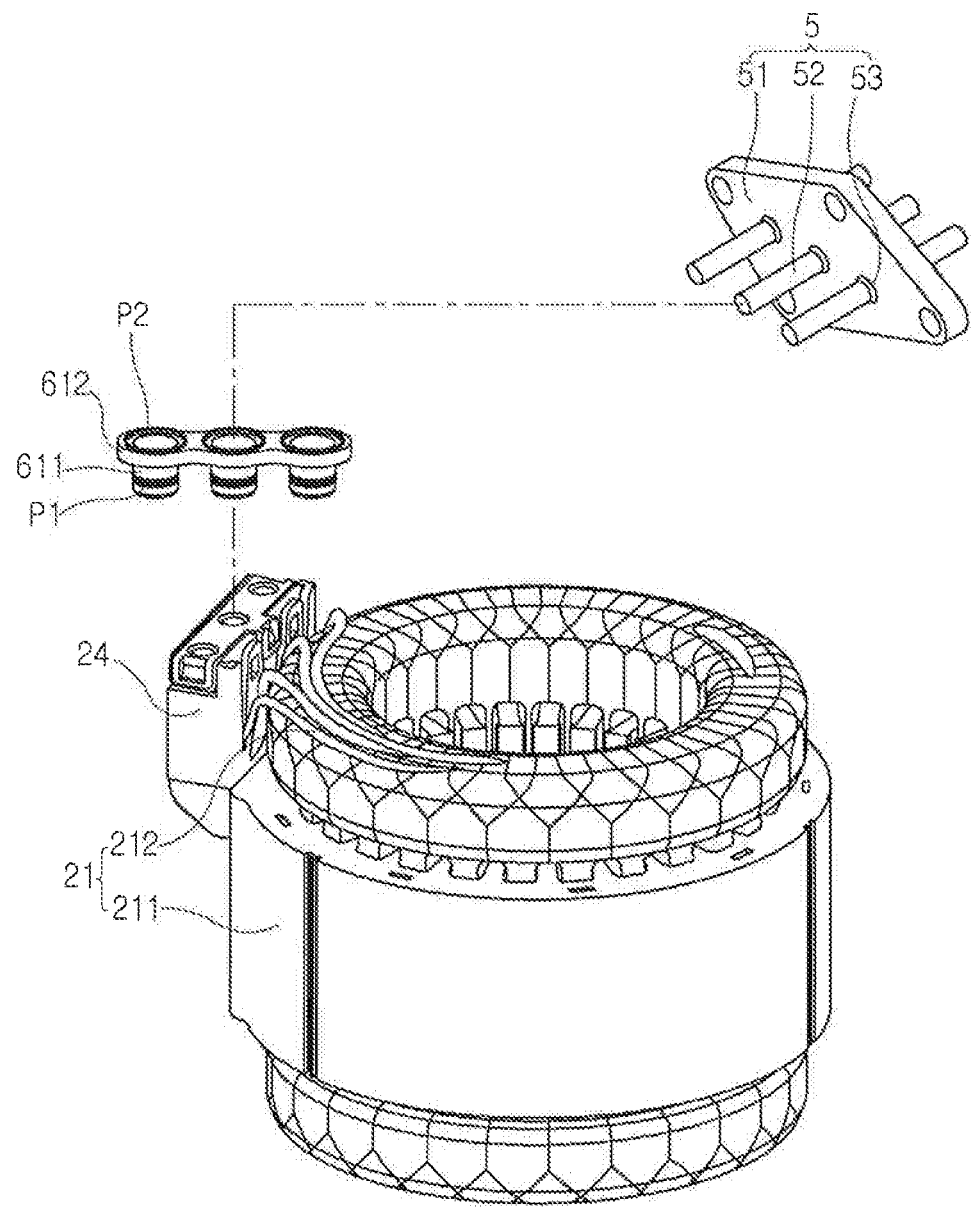
FIG. 4 is an exploded perspective view showing the connector, the terminal, and a sealing member in FIG. 3.

FIG. 3 is a cross-sectional view showing a connection portion between a connector and a terminal in a compressor according to an exemplary embodiment of the present disclosure and FIG. 4 is an exploded perspective view showing the connector, the terminal, and a sealing member in FIG. 3.

Referring to FIGS. 3 and 4, the compressor according to the exemplary embodiment of the present disclosure may include, in a casing 1, a motor 2 that generates a driving force, a compression mechanism 3 that is driven by the motor 2 to compress a refrigerant, an inverter 4 that controls the motor 2, a connector 5 that electrically connects the motor 2 and the inverter 4 to each other, and a sealing member 6 that seals a portion on which the connector 5 is mounted so as to prevent a short circuit from occurring due to the refrigerant.

The casing 1 may include a first casing 11 in which the motor 2 and the compression mechanism 3 are accommodated and a second casing 12, in which inverter 4 is accommodated, that is fastened to the first casing 11.

The first casing 11 may include a partition wall 111 partitioning a motor accommodation space S1 in which the motor 2 is accommodated and an inverter accommodation space S2 in which the inverter 4 is accommodated.

A connector mounting hole 112 on which the connector 5 is mounted may be formed on the partition wall 111 such that the connector 5 penetrates the partition wall 111 to connect the motor 2 and the inverter 4 to each other.

The connector mounting hole 112 may include a first recess 1121 communicated with the inverter accommodation space S2, a second recess 1122 formed to be recessed from the first recess 1121, and a third recess 1123 formed to be recessed from the second recess 1122 so as to communicate with the motor accommodation space S1.

The first recess 1121 may be formed to be recessed on the partition wall 111 from the inverter accommodation space S2 and may have a first seating surface 1121a to be described below on which a terminal holder 51 of the connector 5 is seated.

The second recess 1122 may be formed to be recessed from the first seating surface 1121a, may have an inner diameter thereof smaller than that of the first recess 1121, and may include a second seating surface 1122a to be described below on which a second annular portion 612 of a first sealing member 61 is seated.

The third recess 1123 may be formed to be recessed from the second seating surface 1122a and may have an inner diameter thereof smaller than that of the second recess 1122.

The motor 2 may include a stator 21 fixedly installed inside the casing 1 and a rotor 22 accommodated in the stator 21 to be rotated by an interaction with the stator 21.

The stator 21 may be configured to be formed in a substantially annular shape and to include a multi-laminated iron core 211 and a coil 212 around which the iron core 211 is wound.

The rotor 22 may be formed in a substantially cylindrical shape and may have a permanent magnetic (not shown), and an outer circumferential surface of the rotor 22 may be provided to face an inner circumferential surface of the stator 21 with a predetermined gap. In addition, a rotary shaft 23 that transmits a rotational force of the rotor 22 to the compression mechanism 3 may be press-fitted into and connected to the center of the rotor 22.

Meanwhile, the coil 212 may be electrically connected to the connector 5 through the motor terminal 24 that is connected to the end of the coil 212.

The motor terminal 24 may include a terminal block 241 forming an appearance of the motor terminal 24 and a connection terminal 242 connecting the coil 212 and the connector 5 inside the terminal block 241.

The terminal block 241 may have an internal space, a first opening 2411 for communicating the internal space with an external space (motor accommodation space S1) and a second opening 2412 for communicating the internal space with the external space.

The connection terminal 242 may be formed of a conductive material and may be provided in the internal space of the terminal block 241.

In addition, one side of the connection terminal 242 is connected to the connector 5 which is inserted into the first opening 2411 and the other side of the connection terminal 242 is electrically connected to the coil 212 which is inserted into the second opening 2412, the connection terminal 242 thus may electrically connect the connector 5 and the coil 212 to each other.

In a case where the refrigerant is introduced into the internal space of the terminal block 241 through the connection portion between the first opening 2411 and the connector 5 or the connection portion between the second opening 2412 and the coil 212, a short circuit may occur in the connection portion between the connector 5 and the coil 212 and the connection portion between the connection terminal 242 and the coil 212, in the exemplary embodiment, the problem may be avoided by providing the sealing member 6. The details will be described later.

The compression mechanism 3 may include a fixed scroll 31 which is fixed and installed in the casing 1 and an orbiting scroll 32 which forms a compression chamber together with the fixed scroll 31 and is connected to the rotary shaft 23 so as to compress the refrigerant while turning with respect to the fixed scroll 31. In the exemplary embodiment, the compression mechanism 3 is formed by a scroll type in which the fixed scroll 31 and the orbiting scroll 32 are included, alternatively, the compression mechanism 3 may be formed by various types, for example, a swash plate type in which a swash plate and a piston are included.

The inverter 4 may include a substrate 41, various elements 42 installed on the substrate 41, and an inverter terminal 43. In this case, by connecting the connector 5 to the inverter terminal 43, the inverter 4 may be electrically connected to the motor 2 that is connected to the connector 5.

The connector 5 may include the terminal holder 51 that covers the connector mounting hole 112 of the partition wall 111 and seals the motor accommodation space S1 and the inverter accommodation space S2 with each other so as to support a terminal pin 52 to be described below, the terminal pin 52 that penetrates the terminal holder 51 and is formed of the conductive material to electrically connect the connection terminal 242 and the inverter 4 to each other, and the insulator 53 that insulates the terminal pin 52 from the terminal holder 51.

In this case, the insulator 53 may be formed of ceramic or a glass material, in the exemplary embodiment, the insulator 53 may be formed of a glass material for cost reduction.

The sealing member 6 may include the first sealing member 61 that prevents the refrigerant of the motor accommodation space S1 from being introduced into the internal space of the terminal block 241 through the connection portion between the first opening 2411 and the connector 5, and the second sealing member (not shown) that prevents the refrigerant of the motor accommodation space S1 from being introduced into the internal space of the terminal block 241 through the connection portion between the second opening 2412 and the coil 212.

In this case, the first sealing member 61 may be formed to effectively seal the connection portion between the first opening 2411 and the connector 5, that is relatively difficult to be sealed.

In more detail, the first sealing member 61 may include a first annular portion 611 inserted into the first opening 2411 and the second annular portion 612 extended from the first annular portion 611 and disposed in an external space of the terminal block 241.

The first annular portion 611 may be formed such that an outer circumferential surface of the first annular portion 611 is tightly fitted into an inner circumferential surface of the first opening 2411, thereby preventing the refrigerant being introduced into the internal space of the terminal block 241 through a space between the first annular portion 611 and the first opening 2411.

In addition, the first annular portion 611 may be formed such that an inner circumferential surface of the first annular portion 611 is tightly fitted into an outer circumferential surface of the terminal pin 52, thereby preventing the refrigerant being introduced into the internal space of the terminal block 241 through a space between the first annular portion 611 and the terminal pin 52.

In this case, the first annular portion 611 may be formed to be compressed between the first opening 2411 and the terminal pin 52. That is, a first protrusion P1 may be formed on the outer circumferential surface of the first annular portion 611, the first protrusion P1 protruding from the outer circumferential surface of the first annular portion 611 and extending in a circumferential direction of the first annular portion 611. An outer diameter of the first protrusion P1 is formed to be equal to or larger than an inner diameter of the first opening 2411. An inner diameter of the first annular portion 611 is formed to be equal to or smaller than an outer diameter of the terminal pin 52. In addition, a thickness between an outer circumferential surface of the first protrusion P1 and the inner diameter of the first annular portion 611 may be formed to be larger than a gap between the inner circumferential surface of the first opening 2411 and the outer circumferential surface of the terminal pin 52. In addition, in a case where the motor terminal 24, the connector 5, and the first sealing member 61 are assembled, the first protrusion P1 is pressed to the first opening 2411, the inner circumferential surface of the first annular portion 611 is pressed to the terminal pin 52, the first annular portion 611 may be formed to be compressed between the first opening 2411 and the terminal pin 52.

The second annular portion 612 may be formed to fundamentally prevent the refrigerant of the motor accommodation space S1 from being introduced into a space between the first annular portion 611 and the terminal pin 52.

In more detail, an outer diameter of the second annular portion 612 may be formed to be larger than that of the first annular portion 611 and an outer circumferential part of the second annular portion 612 may be formed to be compressed between the second seating surface 1122a of the second recess 1122 and the terminal holder 51 or between the second seating surface 1122a and the insulator 53, so that the refrigerant of the motor accommodation space S1 is prevented from being introduced into the space between the first annular portion 611 and the terminal pin 52 through a space between the partition wall 111 and the second annular portion 612 and a space between the second annular portion 612 and the connector 5. In the exemplary embodiment, in order to increase a creeping distance for insulation, the second annular portion 612 may be formed to be in contact with the insulator 53 so as to be compressed between the second seating surface 1122a and the insulator 53. That is, in the exemplary embodiment, the second annular portion 612 may have a bottom surface which faces the second seating surface 1122a and an upper surface which is a rear surface of the bottom surface and faces the terminal holder 51 and the insulator 53. In addition, a second protrusion P2 may be formed on the upper surface of the second annular portion 612, the second protrusion P2 protruding from the upper surface of the second annular portion 612, extending in a circumferential direction of the second annular portion 612, and being in contact with the insulator 53. In addition, a third protrusion P3 may be formed on the bottom surface of the second annular portion 612, the third protrusion P3 protruding from the bottom surface of the second annular portion 612, extending in a circumferential direction of the second annular portion 612, and being in contact with the second seating surface 1122a. In addition, a thickness between a tip surface of the second protrusion P2 and a tip surface of the third protrusion P3 may be formed to be larger than a gap between the second seating surface 1122a and the insulator 53. In addition, in a case where the connector 5, the partition wall 111, and the sealing member 6 are assembled, the second protrusion P2 may be pressed to the insulator 53, the third protrusion P3 may be pressed to the second seating surface 1122a, and the second annular portion 612 may be compressed between the insulator 53 and the second seating surface 1122a.

In this case, the first sealing member 61 may be formed of a material having insulation and elasticity overall. That is, both the first annular portion 611 and the second annular portion 612 may be formed of a material having insulation and elasticity. By so doing, the refrigerant of the motor accommodation space S1 may be more effectively prevented from being introduced into the internal space of the terminal block 241, the insulation may be more improved between the terminal pin 52 and the terminal holder 51 and between the terminal pin 52 and the terminal block 241, and the partition wall 111, the connector 5, and the terminal block 241 may be prevented from being damaged by the first sealing member 61.

More specifically, since the first annular portion 611 is formed of the material having elasticity, the first annular portion 611 may be easily compressed between the first opening 2411 and the terminal pin 52. Accordingly, the outer circumferential surface of the first annular portion 611 (in detail, the first protrusion P1) is more tightly fitted into the inner circumferential surface of the first opening 2411, therefore the refrigerant may be more effectively prevented from being introduced into the internal space of the terminal block 241 through the space between the first annular portion 611 and the first opening 2411. In addition, the inner circumferential surface of the first annular portion 611 is more tightly fitted into the outer circumferential surface of the terminal pin 52, therefore the refrigerant may be more effectively prevented from being introduced into the internal space of the terminal block 241 through the space between the inner circumferential surface of the first annular portion 611 and the terminal pin 52. Meanwhile, since the first annular portion 611 is formed of the material having elasticity, the first opening 2411 and the terminal pin 52 may be prevented from being deformed (damaged) by the first annular portion 611. Also, since the first annular portion 611 is formed of a material having insulating properties, a short circuit may be prevented between the terminal pin 52 and the first opening 2411.

In addition, since the second annular portion 612 is formed of the material having elasticity, the second annular portion 612 may be easily compressed between the insulator 53 and the second seating surface 1122a. By so doing, the bottom surface of the second annular portion 612 (in detail, the third protrusion P3) is more tightly fitted into the second seating surface 1122a, the refrigerant may be more effectively prevented from being introduced into the space between the bottom surface of the second annular portion 612 and the second seating surface 1122a. In addition, the upper surface of the second annular portion 612 (in detail, the second protrusion P2) is more tightly fitted into the insulator 53, the refrigerant may be more effectively prevented from being introduced into the space between the upper surface of the second annular portion 612 and the insulator 53. In this case, a primary sealing is performed between the bottom surface of the second annular portion 612 and the second seating surface 1122a, and a secondary sealing is performed between the upper surface of the second annular portion 612 and the insulator 53, therefore the introduction of the refrigerant into the space between the first annular portion 611 and the terminal pin 52 may be remarkably suppressed. Meanwhile, since the second annular portion 612 is formed of the material having elasticity, the insulator 53 and the second seating surface 1122a may be prevented from being deformed (damaged) by the second annular portion 612. Particularly, the second annular portion 612 formed of the material having elasticity may more effectively prevent the insulator 53 formed of fragile ceramic or a glass material from being damaged. In addition, in the second annular portion 612, a portion other than the second protrusion P2 is formed to be spaced from the insulator 53, unnecessary force may be prevented from being added to the insulator 53 so that the insulator 53 is more effectively prevented from being damaged. In addition, the second annular portion 612 is formed of a material having insulating properties, thereby assist the insulator 53. Accordingly, the insulation between the terminal pin 52 and the terminal holder 51 may be improved and the insulation between the terminal pin 52 and the partition wall 111 may be improved also.

Meanwhile, in order to more effectively seal the space between the second annular portion 612 and the insulator 53, the second annular portion 612 (in detail, the second protrusion P2) may be formed to more tightly fit into a predetermined portion of the insulator 53. More specifically, as described above, the insulator 53 is formed of a glass material for cost reduction, due to characteristics of the glass material, the surface of the insulator 53 is not uniformly formed, and a dimension (a tolerance) of the insulator 53 is difficult to be managed, accordingly the sealing may not be easily performed between the insulator 53 and the second annular portion 612. In consideration of this, in the exemplary embodiment, the second annular portion 612 may be formed so that in the insulator 53, the second annular portion 612 is in contact with a relatively uniform (flat) portion of the surface of the insulator 53. That is, the insulator 53 may be formed so that one end 531 of the insulator 53 protrudes from the terminal holder 51 toward the motor terminal 24, the one end 531 of the insulator 53 may be formed so that an outer diameter thereof gradually decreases from the terminal holder 51 toward the motor terminal 24, and a decrease rate of the outer diameter is gradually reduced. At this time, the second annular portion 612 may be formed to be in contact with a portion 5311 having the largest decrease rate of the outer diameter in the one end 531 of the insulator 53. By so doing, although the insulator 53 is formed of a glass material, the sealing may be easily and effectively performed between the insulator 53 and the second annular portion 612.

Meanwhile, the sealing between the second annular portion 612 (in detail, the third protrusion P3) and the second seating surface 1122a may prevent the refrigerant of the motor accommodation space S1 from being introduced into the inverter accommodation space S2. That is, the refrigerant may be prevented from passing a space between the first seating surface 1121a and the terminal holder 51 and being leaked into the inverter accommodation space S2. By so doing, a short circuit due to the refrigerant may be prevented in the inverter 4.

Hereinafter, operation effects of the compressor according to the exemplary embodiment will be described.

That is, when a power source is supplied to the motor 2, following processes are repeated: the compression mechanism 3 receiving a driving force from the motor 2, sucking the refrigerant, compressing and discharging the refrigerant, and emitting the discharged refrigerant outside the compressor. In these processes, since the motor 2 is controlled by the inverter 4 that is electrically connected thereto through the connector 5, a cooling efficiency may be variably controlled.

In this case, the compressor according to the exemplary embodiment includes the first sealing member 61 sealing a portion between the connector 5 and the motor terminal 24, the refrigerant may be prevented from being introduced into the motor terminal 24 to prevent the short circuit from occurring in the motor terminal 24. That is, a current flowing in the coil 212, the connection terminal 242, and the connector 5 may be prevented from being short-circuited in the terminal block 241 through a refrigerant, in advance. Accordingly, malfunction and breakage of the compressor occurring due to the short circuit of the motor terminal 24 may be prevented.

In addition, the first sealing member 61 is formed of a material having elasticity, is compressed between the first opening 2411 and the terminal pin 52, is formed to be compressed between the insulator 53 and the second seating surface 1122a, therefore the refrigerant may be more effectively prevented from being introduced into the motor terminal 24, the partition wall 111, the terminal block 241, and the insulator 53 may be prevented from being deformed (damaged), and the refrigerant is prevented from being introduced into the inverter accommodation space S2, thus the short circuit may be prevented in the inverter 4.

In particular, the second annular portion 612 of the first sealing member 61 is formed of the material having elasticity, accordingly the first sealing member 61 is tightly fitted into the insulator 53 which is difficult to be sealed, and it is possible to effectively seal the portion between the insulator 53 and the second annular portion 612.

Meanwhile, the second annular portion 612 is formed so that in the insulator 53, the second annular portion 612 is in contact with the relatively flat portion 5311 having the largest decrease rate of the outer diameter, therefore the sealing may be more effectively performed between the second annular portion 612 and the insulator 53.

In addition, the second annular portion 612 includes the second protrusion P2, the second protrusion P2 is in contact with the insulator 53, a portion other than the second protrusion P2 is formed to be spaced from the insulator 53, therefore unnecessary force may be prevented from being added to the insulator 53, accordingly the insulator 53 may be more effectively prevented from being deformed (damaged) by the first sealing member 61.

In addition, since the first sealing member 61 is formed of the material having insulating properties, the insulation may be improved between the terminal pin 52 and the terminal block 241, the terminal pin 52 and the terminal holder 51, and the terminal pin 52 and the partition wall 111. In addition, such an improvement of the insulation may lead to decrease in size of the insulator 53.

Figure 5:
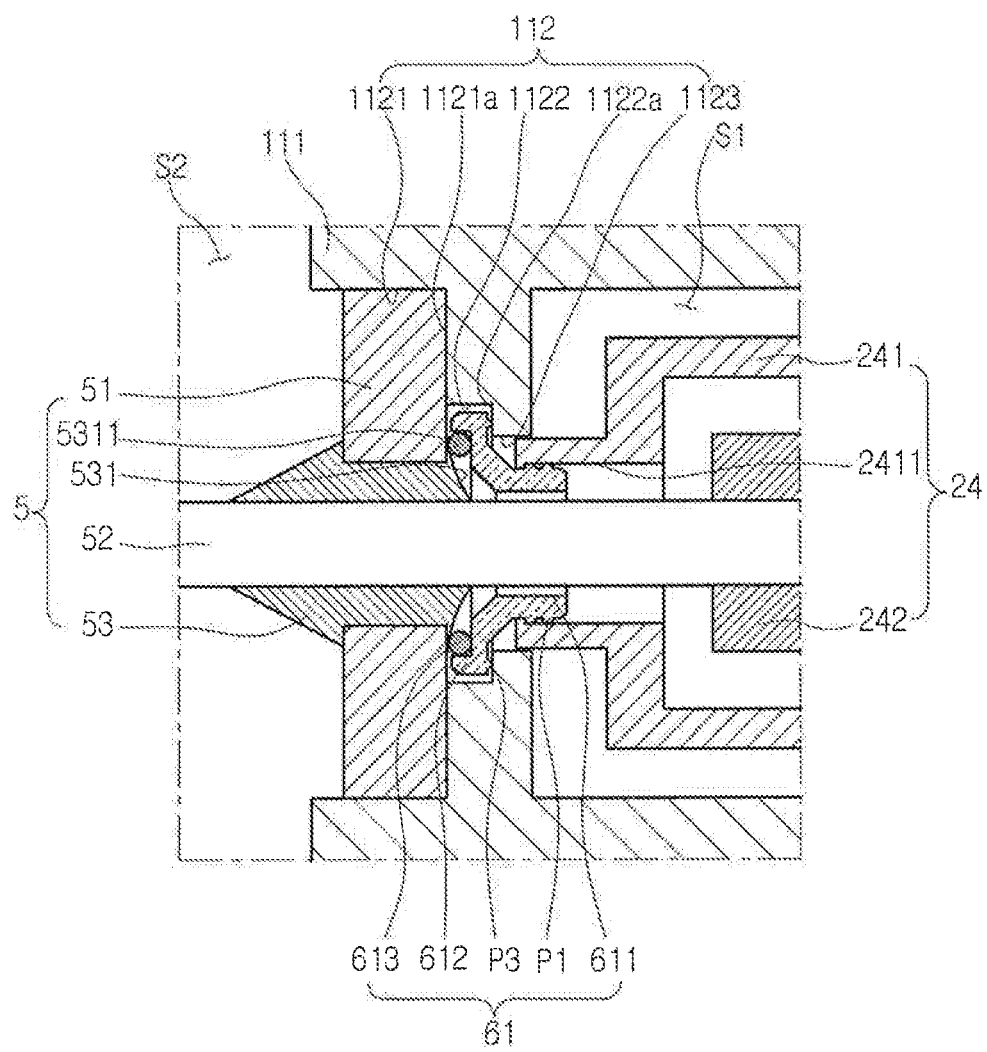
FIG. 5 is a cross-sectional view showing a connection portion between a connector and a terminal in a compressor according to another exemplary embodiment of the present disclosure.
Figure 6:
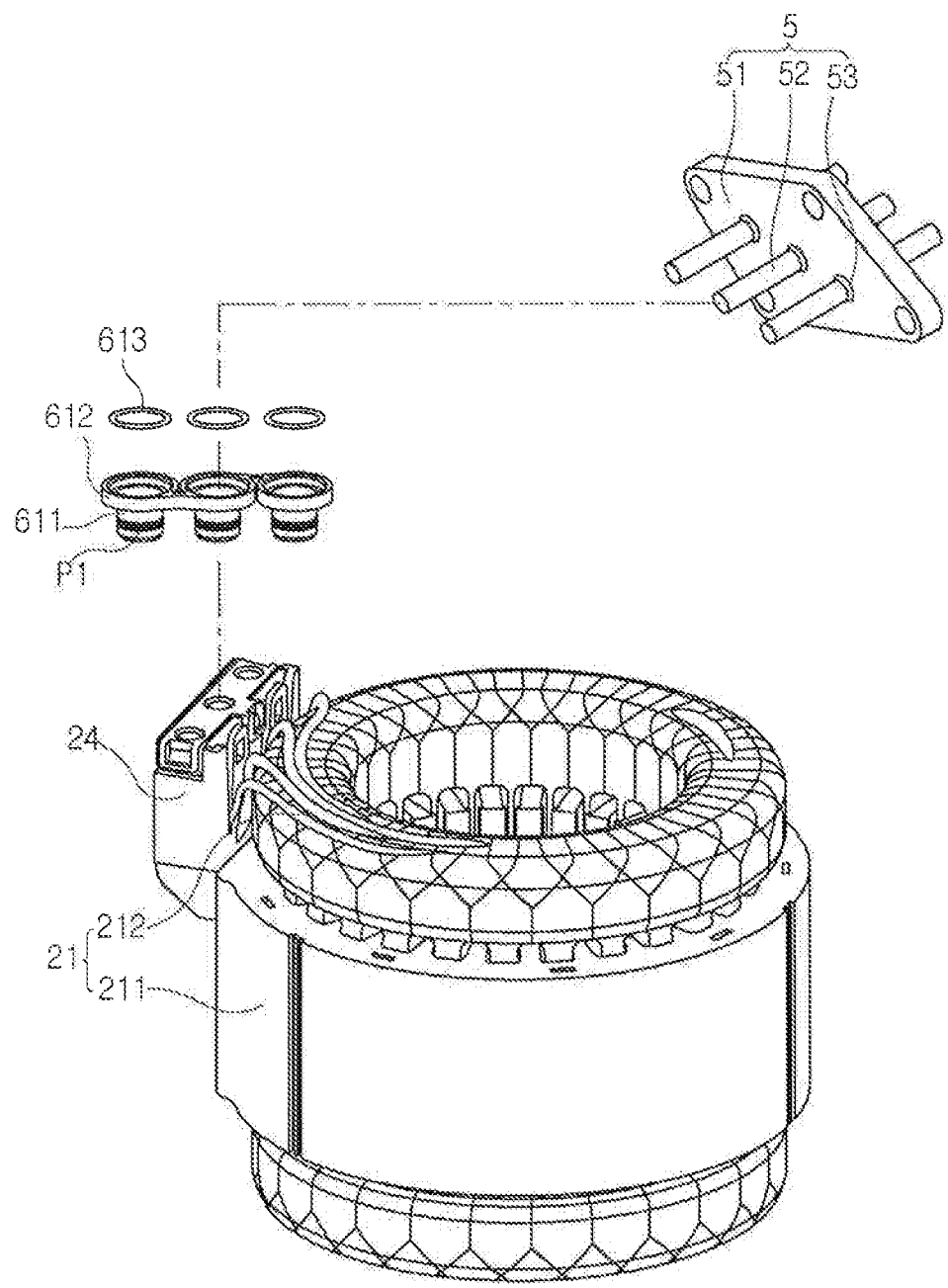
FIG. 6 is an exploded perspective view showing the connector, the terminal, and a sealing member in FIG. 5.

Meanwhile, in the case of the exemplary embodiment described above, the second annular portion 612 is formed to tightly be fitted into the insulator 53, but the first sealing member 61 may further include a separate annular member 613 tightly fitted into the insulator 53 instead of the second annular portion 612, as shown in FIGS. 5 and 6.

FIG. 5 is a cross-sectional view showing the connection portion between the connector and the terminal in the compressor according to another exemplary embodiment of the present disclosure and FIG. 6 is an exploded perspective view showing the connector, the terminal, and the sealing member in FIG. 5.

Referring to FIGS. 5 and 6, the first sealing member 61 may further include the annular member 613 interposed between the second annular portion 612 and the insulator 53, the annular member 613 may be formed of a material having insulation and elasticity, and the annular member 613 may be formed to be compressed between the second annular portion 612 and the insulator 53. In addition, the annular member 613 may be in contact with the relatively flat portion 5311 having the largest decrease rate of the outer diameter in the insulator 53. In this case, the operation effect is substantially the same as the exemplary embodiment described above. However, in this case, at least one of the first annular portion 611 or the second annular portion 612 may be formed of a material of low elasticity (high rigidity) than that of the annular member 613, therefore a degree of freedom for design may be improved.

Meanwhile, in the exemplary embodiment described above, both the first annular portion 611 and the second annular portion 612 are formed to perform a sealing function, although not illustrating, only the first annular portion 611 may be formed to perform the sealing function. That is, the second annular portion 612 may be formed not to be compressed between the partition wall 111 (in detail, the second seating surface 1122a) and the connector 5 (in detail, the insulator 53).

INDUSTRIAL APPLICABILITY

The present disclosure provides a compressor capable of preventing a short circuit from occurring in an electrical circuit between an inverter and a motor due to a refrigerant.

The invention claimed is:

1. A compressor comprising:
a motor configured to generate a driving force;
a compression mechanism configured to be driven by the motor to compress a refrigerant;
an inverter configured to control the motor;
a connector configured to electrically connect the motor and the inverter to each other; and
a sealing member configured to seal a connection portion between a terminal of the motor electrically connected to the connector and the connector;
wherein the connector includes a terminal pin configured to electrically connect the motor and the inverter to each other, a terminal holder configured to support the terminal pin, and an insulator configured to insulate the terminal pin from the terminal holder, and
wherein at least a portion of the sealing member being in contact with the insulator is formed of a material having insulation and elasticity.

2. The compressor of claim 1, wherein
the terminal includes
a terminal block configured to have an internal space, a first opening for communicating the internal space with an external space and a second opening for communicating the internal space with the external space, and
a connection terminal configured to be provided in the internal space of the terminal block and to connect the terminal pin of the connector being inserted into the first opening and a coil of the motor being inserted into the second opening to each other, and
the sealing member includes
a first annular portion configured to be inserted into the first opening, to have an outer circumferential surface thereof tightly fitted into an inner circumferential surface of the first opening, and to have an inner circumferential surface thereof tightly fitted into an outer circumferential surface of the terminal pin, and
a second annular portion configured to be extended from the first annular portion, to have an outer diameter thereof larger than that of the first annular portion, and to be disposed in the external space of the terminal block.

3. The compressor of claim 2, wherein
in the sealing member, the second annular portion is tightly fitted into the insulator, and
at least the second annular portion is formed of a material having insulation and elasticity.

4. The compressor of claim 3, wherein
in the sealing member, the first annular portion and the second annular portion are formed of a material having insulation and elasticity.

5. The compressor of claim 4, wherein
the first annular portion is formed to be compressed between the first opening and the terminal pin.

6. The compressor of claim 5, wherein
a first protrusion is formed on the outer circumferential surface of the first annular portion, the first protrusion protruding from the outer circumferential surface of the first annular portion and extending in a circumferential direction of the first annular portion,
an outer diameter of the first protrusion is formed to be equal to or larger than an inner diameter of the first opening,
an inner diameter of the first annular portion is formed to be equal to or smaller than an outer diameter of the terminal pin, a thickness between an outer circumferential surface of the first protrusion and the inner diameter of the first annular portion is formed to be larger than a gap between the inner circumferential surface of the first opening and the outer circumferential surface of the terminal pin, and in a case where the terminal, the connector, and the sealing member are assembled, the first protrusion is pressed to the first opening, the inner circumferential surface of the first annular portion is pressed to the terminal pin, and the first annular portion is compressed between the first opening and the terminal pin.

7. The compressor of claim 5, wherein the insulator is formed of a glass material.

8. The compressor of claim 4, further comprising:

a casing configured to accommodate the motor, the compression mechanism, the inverter, the connector, and the sealing member, wherein the casing includes a motor accommodation space in which the motor is accommodated and a partition wall partitioning an inverter accommodation space in which the inverter is accommodated, the partition wall includes a connector mounting hole on which the connector is mounted such that the connector penetrates the partition wall to connect the motor and the inverter to each other, the connector mounting hole includes a first recess which is formed in the partition wall to be recessed from the inverter accommodation space and has a first seating surface on which the terminal holder is seated, a second recess which is formed to be recessed from the first seating surface, has an inner diameter thereof smaller than that of the first recess, and has a second seating surface on which the second annular portion of the sealing member is seated, and a third recess which is formed to be recessed from the second seating surface, has an inner diameter thereof smaller than that of the second recess, and communicates with the motor accommodation space, and the second annular portion of the sealing member is formed to be compressed between the terminal holder and the second seating surface or between the insulator and the second seating surface.

9. The compressor of claim 8, wherein the second annular portion has a bottom surface which faces the second seating surface and an upper surface which is a rear surface of the bottom surface and faces the terminal holder and the insulator, a second protrusion is formed on the upper surface of the second annular portion, the second protrusion protruding from the upper surface of the second annular portion, extending in a circumferential direction of the second annular portion, and being in contact with the insulator, a third protrusion is formed on the bottom surface of the second annular portion, the third protrusion protruding from the bottom surface of the second annular portion, extending in the circumferential direction of the second annular portion, and being in contact with the second seating surface, a thickness between a tip surface of the second protrusion and a tip surface of the third protrusion is formed to be larger than a gap between the second seating surface and the insulator, and in a case where the connector, the partition wall, and the sealing member are assembled, the second protrusion is pressed to the insulator, the third protrusion is pressed to the second seating surface, and the second annular portion is compressed between the insulator and the second seating surface.

10. The compressor of claim 9, wherein the insulator is formed so that one end of the insulator protrudes from the terminal holder toward the terminal, the one end of the insulator is formed so that an outer diameter thereof gradually decreases from the terminal holder toward the terminal and a decrease rate of the outer diameter is gradually reduced, and the second protrusion is formed to be in contact with a portion having the largest decrease rate of the outer diameter in the one end of the insulator.

11. The compressor of claim 9, wherein in the second annular portion, a portion other than the second protrusion is formed to be spaced from the insulator.

12. The compressor of claim 4, wherein the insulator is formed of a glass material.

13. The compressor of claim 3, wherein the insulator is formed of a glass material.

14. The compressor of claim 2, wherein the sealing member further includes an annular member interposed between the second annular portion and the insulator, and the annular member is formed of a material having insulation and elasticity.

15. The compressor of claim 14, wherein the annular member is formed to be compressed between the second annular portion and the insulator.

16. The compressor of claim 15, wherein the insulator is formed so that one end of the insulator protrudes from the terminal holder toward the terminal, the one end of the insulator is formed so that an outer diameter thereof gradually decreases from the terminal holder toward the terminal and a decrease rate of the outer diameter is gradually reduced, and the annular member is formed to be in contact with a portion having the largest decrease rate of the outer diameter in the one end of the insulator.

17. The compressor of claim 2, wherein the insulator is formed of a glass material.

18. The compressor of claim 1, wherein the insulator is formed of a glass material.

19. The compressor of claim 1, further comprising:

a casing configured to accommodate the motor, the compression mechanism, the inverter, the connector, and the sealing member, wherein the casing includes a motor accommodation space in which the motor is accommodated and a partition wall partitioning an inverter accommodation space in which the inverter is accommodated, the connector penetrates the partition wall to electrically connect the motor and the inverter to each other, and the sealing member is formed to further tightly seal a portion between the connector and the partition wall.

* * * * *